May 21, 1968  T. W. PALMER ETAL  3,383,948
POWER PREFERENCE CLUTCH

Filed Nov. 30, 1965  2 Sheets-Sheet 1

INVENTOR
Thomas W. Palmer &
Ronald G. Hune

Their attorneys

INVENTORS
Thomas W. Palmer and
Ronald G. Hune.
BY
THEIR ATTORNEYS

United States Patent Office 3,383,948
Patented May 21, 1968

3,383,948
POWER PREFERENCE CLUTCH
Thomas W. Palmer and Ronald G. Hune, Harris County, Tex., assignors to E-I-M Company, Incorporated, Missouri City, Tex.
Filed Nov. 30, 1965, Ser. No. 510,541
11 Claims. (Cl. 74—625)

ABSTRACT OF THE DISCLOSURE

A dual clutch arrangement is disclosed for coupling one of two power sources alternately to an output shaft. The clutch includes a double-ended sleeve which is slidingly and keyingly secured to the output shaft. A pivoted shifting fork operatively secured to the clutch sleeve and is biased into a position of clutch engagement with one of the power sources. However, a flexible finger is secured to the shifting fork and axially but eccentrically engages the end of the first input shaft. Thus, when the first input source is energized the finger is swept off the end of the first input shaft to permit the shifting fork bias to engage the clutch sleeve with the first power source. The shifting fork can be reset manually, upon deenergization of the first power source to restore the flexible finger to its abutting position against the end of the first input shaft. When thus restored the clutching sleeve is moved against the action of the biasing spring into clutching engagement with the second power source. Alternatively, the second power source incorporates an automatic reset mechanism including a groove eccentric member mounted for rotation by the second power source and a second flexible finger on the shifting fork positioned for momentary engagement with the eccentric member to reset the first mentioned flexible finger against the end of the first input shaft.

---

The present invention relates to clutch mechanisms and more particularly to a dual clutch mechanism associated with an output shaft, which can be coupled thereby to alternative operating means or sources of power.

The clutch mechanism of the invention is useful in a great number of applications such as for connecting motor driven valves and the like which are further arranged for alternative opeartion by manually operated means.

The power preference clutch mechanism of the invention is particularly useful for automatic activation of the clutch mechanism to couple its output shaft with an external power source, such as a drive motor therefor when the latter is energized. On the other hand, when the motor drive for the clutch mechanism is de-energized, the clutch mechanism is reset for manual operation by ordinary manipulation of the manually operated means. Means are associated with the clutch mechanism, upon further operation of the manually operated means, for automatically adjusting the engaging clutch parts thereof in the event that such parts do not mesh initially.

These and other objects, features and advantages of the invention, together with structural details thereof, will be elaborated upon during the forthcoming description of an illustrative form of the invention when taken in conjunction with the accompanying drawings wherein:

FIGURE 1 is a front elevational view, partially exploded of one form of power preference clutch mechanism arranged in accordance with the invention, with portions thereof being sectioned and other parts being broken away in order to show the invention more clearly;

FIGURES 2, 3, and 4 are schematic representations, partially exploded, of the clutch mechanism of FIGURE 1 and showing the mechanism in differing operational positions thereof;

Figure 1:
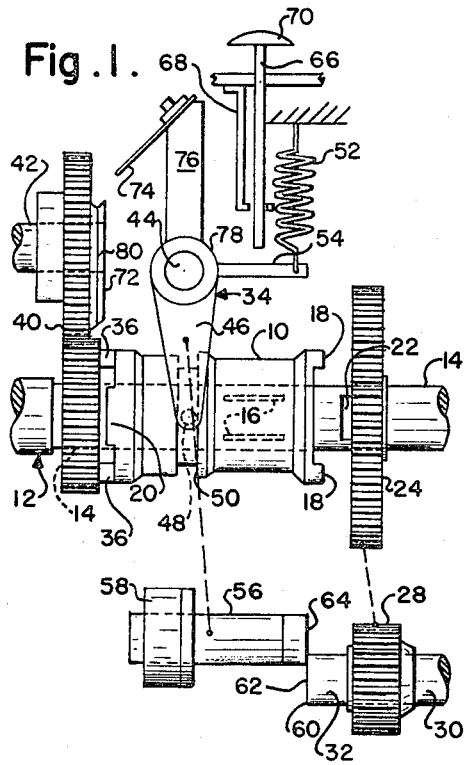
Figure 6:
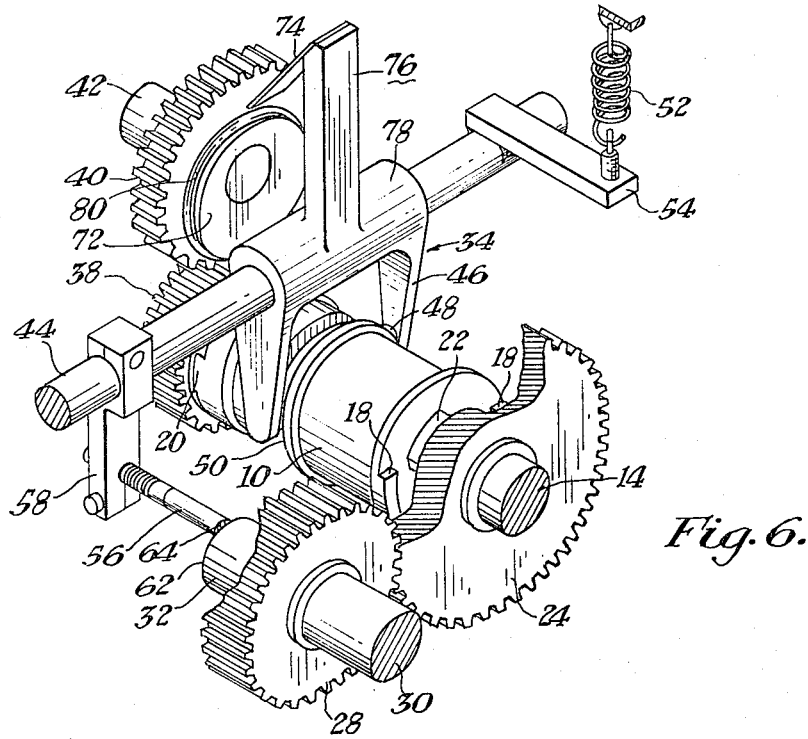
FIGURE 6 is an isometric view of a similar clutch mechanism showing in greater detail the operation of the automatic reset means of FIGURES 1–5; and, FIGURE 7 is an isometric view of a similar clutch mechanism showing in greater detail the operation of the manual reset means of FIGURES 1 and 5.

Referring now to FIGURES 1 and 6 of the drawings with greater particularity, the exemplary form of the invention shown therein comprise a double-ended or dual clutch member 10 and an output shaft 12 upon the journaled portion 14 of which the clutch member 10 is keyed for rotation therewith by means of a plurality of longitudinally extending keying members 16. The clutch member 10, which is of sleeve or tubular configuration, is otherwise mounted for limited longitudinal movement upon the shaft journal 14 by sliding engagement with the aforesaid keying members.

The output shaft 12, a portion of which is shown in the drawings, can have at its other end a suitable pinion or worm-gear (not shown) mounted thereon for operating any desired external appliance, such as the valve operating mechanism noted previously.

At each end of the clutch member 10, are formed a number of clutch elements or teeth 18 and 20 respectively with two such teeth being employed in this example at each end of the clutch member 10. The clutch sleeve teeth 18, then, are disposed for engagement with similarly disposed clutch elements or teeth 22 formed on the adjacent surface of an idler member, such as gear 24. The idler gear 24 is rotatably mounted upon the shaft journal 14, 26 and is thus adjacent to and in axial alignment with the clutch member 10. A power pinion 28 is enmeshed with the idler gear 24 and is keyed for rotation with a first power input shaft 30 forming the output of a suitable external power source (not shown) such as the aforementioned drive motor. An end portion 32 of the input shaft 30 is extended in a short distance beyond the pinion 28 for engagement with components of the clutch shifter fork 34 described in greater detail below.

At the other end of the clutch member 10, the teeth 20 thereof are enmeshable with similarly disposed clutch teeth 36 formed on the adjacent surface of a second idler member such as gear 38 which is also rotatably mounted upon the output shaft journal 14 at a position adjacent to and thus in axial alignment with the clutch member 10. The second idler gear 38 is enmeshed with a second input power pinion 40 which is keyed for rotation to a second power input shaft 42. The input shaft 42 can be coupled to a second suitable external power source, for example, manually operated means such as a hand wheel (not shown) keyed to the shaft 42; or alternately, the second power shaft 42, can be rotated by suitable motor driven servo-mechanism (not shown) connected thereto.

With the dual clutch arrangement described thus far, it will be seen that when the clutch teeth 18 and 20 are enmeshed power is supplied to the output shaft 12 from the first or motor-driven input shaft 30 through the gearing train 28, 24 and the clutch member 10, which rotates the output shaft 12 by means of its connection thereto through keying member 16. On the other hand, when the clutch member 10 is moved longitudinally to the left, as viewed in FIGURE 1 of the drawings, the clutch teeth 20, 36 are enmeshed so that the clutch member 10 and the output shaft 12 are rotated through gearing train 38, 40 by the second power input shaft 42, which is operated manually, in this example.

Means are associated with the clutch member 10 for shifting, or longitudinally moving the clutch member 10 between the two positions just described, i.e., the engagement of clutch teeth 18, 22 and the engagement of clutch teeth 20, 36. Additional means are associated with the shifting means for automatically engaging the clutch teeth 18, 22 when the power source or drive motor coupled to the first power input shaft 30 is energized. Still other means are associated with the clutch shifting means for engaging the other clutch teeth 20, 36 of the dual clutch mechanism as when power is applied to the second power input shaft 42 as by rotation of the aforementioned hand wheel. However, the last-mentioned means is permitted to actuate the clutch mechanism only when power is not being applied to the first-mentioned power input shaft 30, i.e., when the drive motor or the like coupled thereto is not running.

In accordance with the invention, one form of such clutch shifting means includes the aforementioned clutch shifting fork 34 pivotally mounted upon a suitable shaft denoted by reference character 44. The clutch shifter fork 34 includes a pair of spaced leg portions 46 terminating at their ends in a pair of opposed pins 48. The pins 48 are inserted into a circumferential groove or journal 50 formed in the clutch member 10. Longitudinal movement of the clutch member 10 is then effected by pivotal movement of the shifting fork 54, and in this example, the clutch member 10 is biased into engagement of its clutch teeth 18 with the clutch teeth 22 of the first power pinion 24 by means of biasing spring 52 connected to an arm or lever 54 rigidly secured to the shifting fork 34. Thus, the clutch member 10 is normally held into clutching engagement with the idler gear 24, and the output shaft 12 is coupled to the first input power shaft 30. Therefore, the output shaft 12 of the clutch mechanism is normally rotated by the first power input shaft 30 when the drive means associated therewith is energized.

However, whenever the aforementioned drive means is de-energized and rotation of the first input shaft 30 is stopped, means are connected to the clutch shifter fork 34 for rotating the latter slightly about its pivot mounting 44 to cause a flexible finger member 56 to abut the adjacent end portion 32 of the first input shaft. Flexible finger 56, which in this example is a relatively stiff coil spring, is secured at its other end to a bracket 58 mounted on one of the legs 46 of the shifter fork 34. When the shifter fork is moved as aforesaid, the flexibility of the finger 56 allows the end of the finger to deflect past the edge 60 of the power shaft end 32 and then to swing back into abutting position with the end face 62 of the power shaft 30. The abutments of the flexible finger 56 together with the columnar strength of the coil spring from which the finger 56 is formed, is sufficient to overcome the biasing force of the spring 52 and thus to disengage the clutching teeth 18, 20 and to disconnect the clutch mechanism from the gearing train 24, 28 and the first power source.

At the same time, the length of the flexible finger 56 is such that the clutch teeth 20, 36 at the other end of the clutch member 10 are engaged, as shown in FIGURE 1, so that the clutch mechanism now can be energized by the second power source, such as the aforementioned handwheel for manual adjustment of the appliance to which the power output shaft 12 is connected. However, this engagement of the clutch teeth 20, 36 is attained only so long as the first power source is de-energized and no power is supplied to the first power input shaft 30. When the power source coupled to the first input shaft 30 is again energized, rotation of the input power shaft end portion 32 sweeps the abutting end 64 of the flexible finger 56 off the end surface 62 and past the edge 60 of the power input shaft. In furtherance of this purpose, as shown in FIGURES 1, 5 and 6, the finger end 64 desirably eccentrically engages the end of the power input shaft 30. The finger 56 then flexes past the end edge 60 of the power input shaft 30 to the position shown in FIGURE 2 of the drawings. When this occurs, subsequent action of the shifting fork 34 is controlled by the biasing spring 52 and automatic reset finger 74 as described below in connection with FIGURES 2, 4, and 6 or by the spring 52 and manual reset plunger 66 as described with reference to FIGURES 1 and 7.

In this arrangement of the invention, both manual and automatic means are provided for pivotally resetting the shifter fork 34 and thus again abutting the flexible finger 56 against the end portion 32 of the first power input shaft 30 as aforesaid. The manual resetting means will be described first. The latter means includes a spring-loaded plunger denoted generally by reference character 66 supported for vertical longitudinal movement, as viewed in FIGURE 1, in a suitable bracket 68. The bracket 68 is disposed so that the plunger 66 can be moved generally in the path of movement of the spring arm 54 secured to the shifter fork 34 when the plunger 66 is depressed, as by manually engaging an operating knob 70 thereof. The lower end of the plunger 66, then, engages the spring arm 54 to move the shifting fork 34 angularly about its pivot shaft 44 until the flexible finger 56 can flex to pass over the edge 60 and abut the end 62 of the first power input shaft 30 and thus to retain engagement of the clutch teeth 20, 36 against the biasing force of the shifter fork spring 52. The clutch member 10 and output shaft 12 are then coupled through gearing train 38, 40 to the second power input shaft 42. Of course, if the first power input shaft 30 is rotating, inadvertent operation of the plunger 66 will only result in temporarily disconnecting the clutch teeth 18, 22, as the flexible finger will not remain in abutment with the rotating end of the input shaft 30.

Figure 2:
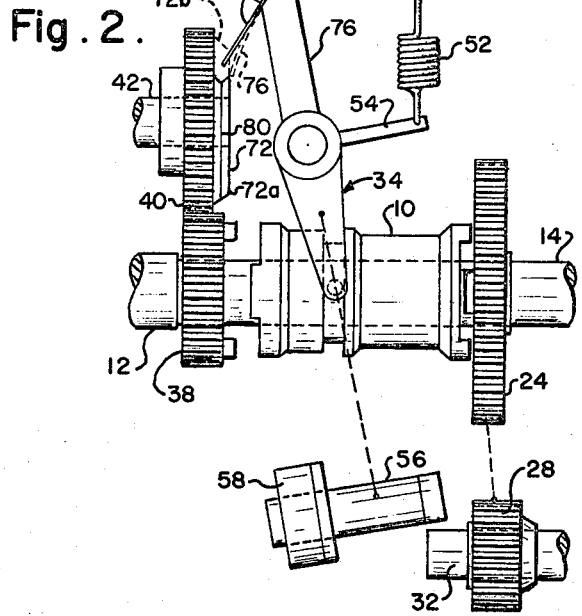

As noted previously, additional, automatic resetting means are provided for resetting the flexible finger 56 against the end of the first power input shaft 30. When the latter is motionless, the latter resetting means are energized automatically by rotation of the second power input shaft 42. In one arrangement therefor, in accordance with the invention, an eccentrically located generally circular cam surface 72, as better shown in FIGURE 5, is formed upon the second power pinion 40 on the side adjacent the shifting fork 34 and is arranged for cooperation with a second flexible finger 74 secured to a bracket 76 which is rigidly joined to the pivotal portion 78 of the clutch shifting fork. Referring now to FIGURE 2, it will be seen that the second flexible finger 74, can assume one of two positions relative to the cam 72 when the clutch member 10 is engaged with the first idler gear 24. When the cam 72 is in a low position 72a, as determined by the angular disposition of the second power pinion 40, the flexible finger 74 clears the upper edge of the cam 72. On the other hand, when the cam 72 is in a high position 72b, relative to the axis of the second power pinion 40 and its input shaft 42, the finger 74 will be flexed slightly but inoperatively against the adjacent flat surface of the cam 72 as denoted by the dashed outline 76. The finger 74 will remain in either one of the positions shown in FIGURE 2 so long as the shifter fork 34 is not reset and the clutch member 10 thus remains in engagement with the first idler gear 24, as shown in FIGURE 2.

Figure 3:
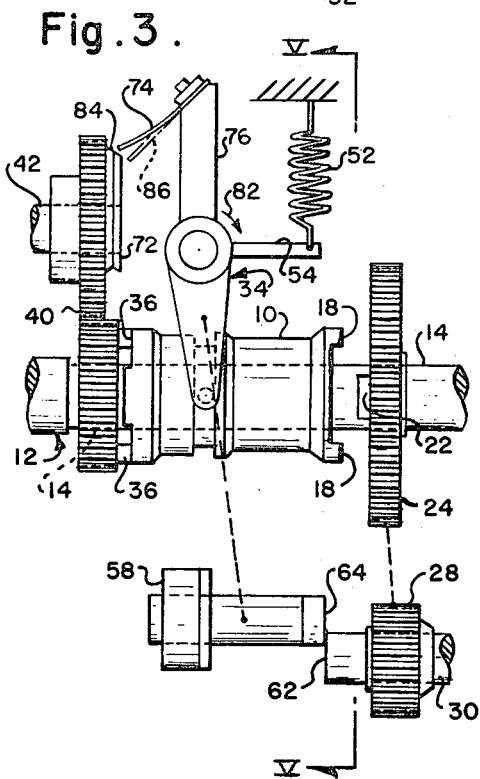

The shifting fork 34 can be reset from the position shown in FIGURE 2, either by operation of the plunger 66 as described above or by rotation of the second power shaft 42 as by the aforementioned handwheel if used, which will now be described. If the handwheel or second power pinion 40 is not in a position as denoted by the dashed outline 72b of its cam 72, the pinion 40 and its shaft 42 must first be rotated until the second flexible finger 74 assumes the position shown in solid outline of FIGURE 2. Further rotation of the pinion 40 and the eccentrically located cam 42 causes the free end of the flexible finger 74 to engage the peripheral groove 80 formed in the raised edge surface of the cam 72, as better shown in FIGURE 5 of the drawings. As the pinion and cam 42, 72 are then rotated further toward the high position 72b of the cam (FIGURE 2), the columnar strength of the flexible finger 74 together with the second finger bracket 76 pivot the clutch fork 34 in a clockwise direction about the pivot shaft 44 as denoted by arrow 82 of FIGURE 3 against the biasing force of the spring 52. This angular displacement of the clutch fork 34 again resets the first flexible finger 56 into eccentric abutment with the adjacent end 32 of the first power shaft 30, as shown in FIGURE 1 or 3 of the drawings. Further rotation of the cam 72 at this point, brings a relief surface 84 thereof (FIGURES 3 and 5) to the top position of the cam 72 and allows the second flexible finger 74 to escape from the cam groove 80 whereupon it assumes the position denoted by the dashed outline 86 of FIGURE 3. At the latter position of the second flexible finger 74, the shifter fork 34 is retained in its clutching position with the second idler gear 24 by abutment of its first flexible finger 56 with the first power shaft 30, and the clutch member 10 and output shaft 12 can be rotated by operation of the second power input shaft 42. This coupling, however, is terminated by the power preference feature of the clutch mechanism, as when initial rotation of the first power input shaft 30 terminates abutment of the first flexible finger 56 and permits re-engagement of the clutch teeth 18, 20 under impetus of the shifter fork biasing spring 52. The clutch mechanism thus is automatically returned to its normal running position as shown in FIGURE 2.

Figure 4:
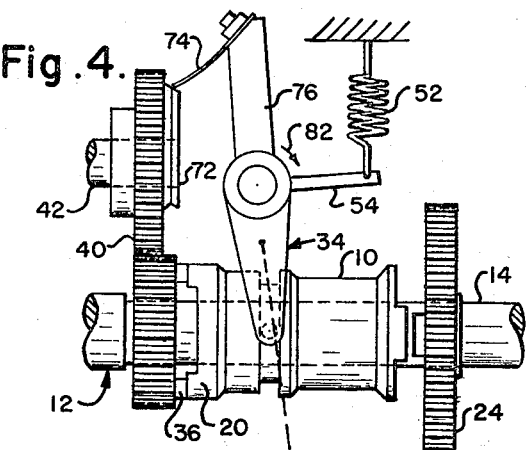
Figure 5:
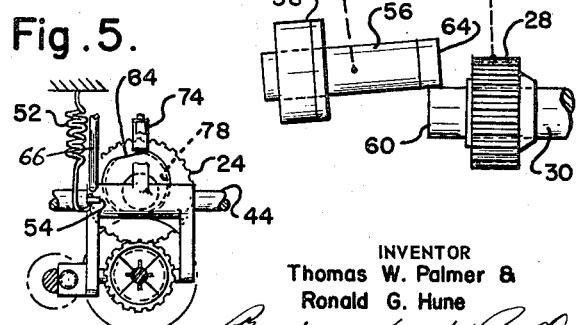
FIGURE 5 is a reduced cross-sectional view of the clutch mechanism of FIGURE 1 and taken generally along reference line V—V thereof.

Referring now to FIGURE 4 of the drawings, means are depicted therein for preventing the escape of the second flexible finger 74 in the event that the clutching teeth 20, 36 do not mesh properly, i.e. in the manner shown in FIGURES 1 and 3, but instead abut respectively but improperly as shown in FIGURE 4. When the clutch teeth 20, 36 abut, the shifting fork 34 cannot be pivoted sufficiently in the clockwise direction for the end 64 of the first flexible finger 56 to clear the end edge 60 of the first power input shaft 30. With this arrangement, the shifting fork 34 cannot be reset against the action of the biasing spring 52, since abutment of the flexible finger 56 with the end of the first input shaft 30 cannot be established. However, the second flexible finger 74 also is of such length that it cannot escape from the cam groove 80 by means of the cam relief surface 84. Thus, the columnar strength of the second flexible finger 74 by its flexed but beaming engagement with the relief surface 84 overcomes the bias of the shifter fork spring 52 and maintains the first clutch teeth 18, 22 in a disengaged position as shown in FIGURE 4 to prevent the application of primary power to the clutch member 10 through the first input shaft 30, which would damage the abutting teeth 20, 36. With the second flexible finger 74 retained thusly against the cam 72, a succeeding revolution of the second idler gear 40 and cam 72 causes the clutching teeth 20 and 36 to be enmeshed properly and the second flexible finger 74 escapes from the cam 72 as described above with reference to FIGURE 3. Obviously, the relative sizes of the second pinion 40 and the idler gear 38 can be selected such that a revolution of the second pinion 40 will not, at the normal escape position of the cam 72, again bring the clutch teeth 20, 36 into the abutting engagement shown in FIGURE 4.

Figure 7:
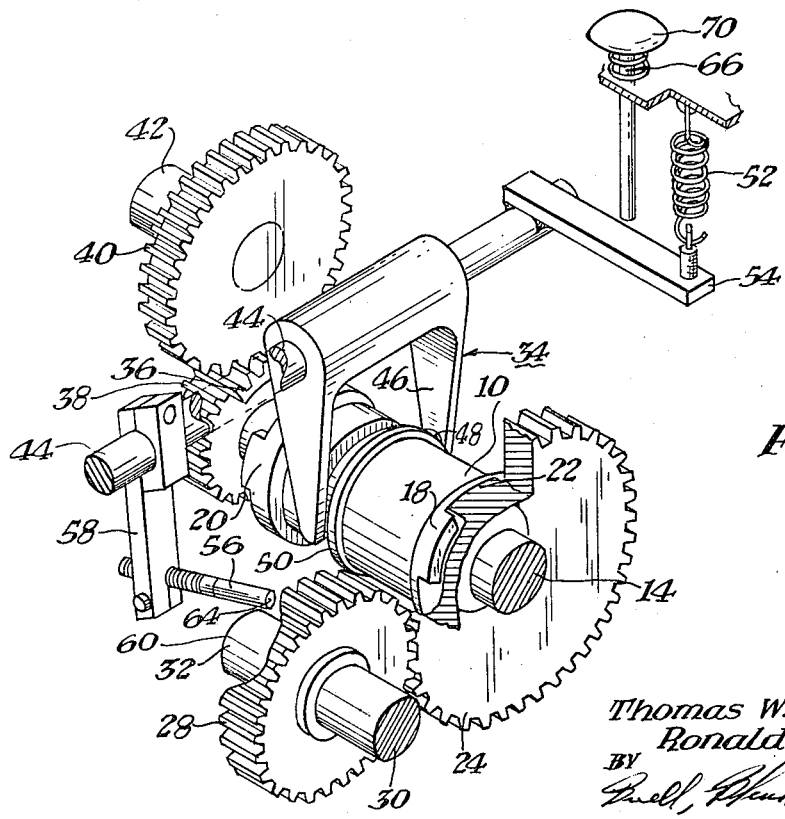

In operation, referring primarily to FIGURE 6, a source of primary power such as an electric motor (not shown) is coupled as a first power source to the first power input shaft 30. A second power source, such as a handwheel, handcrank, or second electric motor (not shown), is coupled to the second power input shaft 42. The biasing spring 52 is connected to the shifter fork 34 such that the fork 34 and clutch sleeve 10 are normally urged toward clutching engagement with the clutch teeth 22 of the primary idler gear 24, as shown in FIGURES 2 and 7.

As better shown in FIGURE 6 the first flexible finger 56 normally abutts the adjacent end 62 of the first input shaft 30 to retain the shifter fork 34 and clutch sleeve 10 in clutching engagement with the clutch teeth 36 of the secondary idler gear 38, against the action of the biasing spring 52. Thus, while the first power input shaft 30 remains motionless the output shaft 14 is normally coupled to the second power input shaft 42 through clutch sleeve 10 and the gearing train 38-40 by the restraining action of the finger 56.

However, the flexible finger 56 (which can be partially or completely formed from a length of relatively stiff coil spring for example) is sensitive to energization of the aforementioned primary power source to provide the power preference feature of the dual clutching arrangement. As soon as the first power input shaft 30 begins to rotate (usually within the first quarter revolution) the flexible finger 56 is wiped off the end of the shaft 30 to its position shown in FIGURES 2 and 7. The wiping-off action (FIGURE 7) is facilitated by eccentric abutment of the finger 56 (FIGURES 5 and 6) at the end 62 of the shaft 30. This action deactivates the restraining action of the finger 56. In consequence the biasing spring 52 immediately moves the shifter fork 34 and clutch sleeve 10 into clutching engagement with the primary idler gear clutch teeth 22. It should be noted that the latter clutching engagement occurs almost instantaneously upon energization of the primary power source. Thus, the clutch teeth 18, 22 are enmeshed at a relatively low speed of the idler gear 24 to avoid damage and other unusual wear.

As a result, almost immediately upon starting the primary power source, power can be transferred therefrom to the output shaft 14 by means of the first power input shaft 30, gearing train 24-28, and clutch sleeve 10. As long as the primary power source remains energized to rotate the first power input shaft 30 the arrangement of FIGURE 6 cannot be automatically reset except for negligible and momentary intervals. Rotation of the second power input shaft 22 and resetting engagement of the eccentric cam 72 and second flexible finger 74 will only momentarily reposition the first flexible finger 56 upon the end of the first power input shaft 30 while the latter is rotating. That is, the first flexible finger will immediately be wiped off the end of the first power input shaft as long as the latter is rotating, as described above.

Upon deenergization of the first or primary power source the restraining finger 56 can be reset against the end of the shaft 30 while the latter is motionless. In the arrangement of FIGURE 6 this resetting action is performed only automatically and upon initial energization of the second power source coupled to the second power input shaft 42. As shown in FIGURE 2 when the restraining finger 56 has been wiped off the end of the first input shaft 30 the resulting pivotal movement of the pivotal fork 34 by biasing spring 52 positions the reset finger 74 so that its free end is poised directly above the groove 80 of the eccentric cam 72. Subsequent rotation of the second power input shaft 42 causes the end of the finger 74 to be entrapped in the groove (FIGURE 5). The camming action of the eccentric groove 80 raises the adjacent end of the finger 74 and pivots the shifter fork 34 clockwise until the flexible restraining finger 56 snaps past the edge 60 of the shaft 30 and face 62 is again reset against the end thereof, as shown in FIGURE 3.

At the maximum elevation of the cam 72 relative to the secondary input gear 40, the end of the flexible finger 74 is then released from the groove 80 by the inclined cam surface 84 as shown in FIGURE 3. However, if the clutch teeth 36, 20 fail to enmesh (FIGURE 4), the finger 74, as a result of insufficient clearance cannot be released from the inclined surface 84, and the length of the restraining finger 56 is such that it cannot be reset against the end of shaft 30. Any such inadvertent abutment of the clutch teeth 20, 36 is cured by a succeeding revolution of the second power input shaft 42 and cam 72 as explained above.

Referring again to FIGURE 6 the clutch sleeve 10 is now positioned in clutching engagement with the second idler gear 38 so that power is transferred to the output shaft 14 from the second power input shaft 42 through gearing train 38–40 and clutch sleeve 10 as long as the primary input shaft 30 remains motionless. This occurs regardless of position of the cam 72 (FIGURES 1 and 6) as the clutched engagement of the teeth 20, 36 is maintained by abutment of the restraining finger 56 and shaft 30 to oppose the action of the biasing spring 52.

Referring now to FIGURE 7, the operation of the manual reset power preference clutch shown therein is identical to the clutch mechanism of FIGURE 6 with respect to the restraining finger 56 and the opposing action of the biasing spring 52. The clutch mechanism of FIGURE 7 is not automatically reset, however, upon energization of the second power input shaft 42. Instead a momentary depression of the manual reset plunger 66 re-establishes the abutting relation of the finger 56 against the end of the shaft 30, provided the latter is motionless, by clockwise pivoting of the shifter fork 34. This action effects clutching engagement of the teeth 20, 36 in the manner shown in FIGURE 6.

However, the manual reset clutch mechanism of FIGURE 7 has the advantage that the primary power source need not be deenergized to permit transfer of power from the secondary power input shaft 42 to the output shaft 14. This is accomplished by manually depressing and holding the plunger 66 to effect through bracket 54 the aforementioned clockwise pivoting of the shifter fork 34 to the position thereof shown in FIGURE 6. As long as the plunger 66 is thus depressed in this manner the shifter fork 34 will effect engagement of the clutch teeth 20, 36 (in the manner shown in FIGURE 6) against the action of the biasing spring 52, although the primary power source continues to be energized and the shaft 30 is rotating. While the plunger 66 is thus depressed power can be transferred from the secondary power source to the output shaft 14 without deenergizing the primary power source. Upon release of the manual reset 66 the restraining finger 56 is immediately wiped off the end of the steel rotating shaft 30 in realization of the similar power preference feature of the clutch mechanism of FIGURE 7.

From the foregoing it will be seen that the clutch mechanism of the invention is arranged so as to exhibit a power preference for the engagement of the first power shaft 30 with clutching mechanism. It will be obvious, of course, depending upon the application of the invention, that the drive motor or the like and the handwheel operator for the first and second power input shafts 30 and 42 can be respectively interchanged if desired, or that the handwheel operator can be replaced entirely by suitable motor driven servo-mechanism.

The descriptive and illustrative materials employed herein thus are presented for purposes of exemplifying the invention and not in limitation thereof. Therefore, numerous modifications of the invention will occur to those skilled in the art without departing from the spirit and scope of the invention. It is also to be understood that certain features of the invention can be advantageously utilized without a corresponding use of other features thereof.

Accordingly, what is claimed is:

1. A dual clutching mechanism comprising a double-ended clutch sleeve slidably mounted upon an output power shaft but secured thereto for driving rotation therewith, a clutch shifting member operatively engaging said clutch sleeve for sliding said clutch sleeve along said shaft to alternate positions of clutching engagement with first and second power input sources respectively, biasing means coupled to said shifting member and urging said shifting member and said clutch sleeve into clutching engagement of said clutch sleeve with said first power source, and means sensitive to the energization of said first source and engaging said shifting member for retaining said shifting member and said clutch sleeve in clutching engagement with said second power source against the action of said biasing means until said first source is energized whereupon said sensitive means are deactivated and said biasing means effect clutching engagement with said first source.

2. A dual clutching mechanism comprising a double-ended clutch sleeve slidably mounted upon an output power shaft but secured thereto for driving rotation therewith, a clutch shifting member operatively engaging said clutch sleeve for sliding said clutch sleeve along said shaft to alternate positions of clutching engagement with first and second power input sources respectively, biasing means coupled to said shifting member and urging said shifting member and said clutch sleeve into clutching engagement of said clutch sleeve with said first power source, and means sensitive to the energization of said first source and engaging said shifting member for retaining said shifting member and said clutch sleeve in clutching engagement with said second power source against the action of said biasing means until said first source is energized whereupon said sensitive means are deactivated and said biasing means effect clutching engagement with said first source, said sensitive means including a finger secured to said shifting member and extending into bearing engagement with an end portion of a power input shaft forming part of said first power source when said input shaft is motionless, and cooperating means on said finger and said input shaft end portion for disengaging said finger from said end portion upon rotation of said power input shaft.

3. A dual clutching mechanism comprising a double-ended clutch sleeve slidably mounted upon an output power shaft but secured thereto for driving rotation therewith, a clutch shifting member operatively engaging said clutch sleeve for sliding said clutch sleeve along said shaft to alternate positions of clutching engagement with first and second power input sources respectively, biasing means coupled to said shifting member and urging said shifting member and said clutch sleeve into clutching engagement of said clutch sleeve with said first power source, and engaging said shifting member for retaining said shifting member and said clutch sleeve in clutching engagement with said second power source against the action of said biasing means until said first source is energized whereupon said sensitive means are deactivated and said biasing means effect clutching engagement with said first source, said sensitive means including an elongated flexible finger secured to said shifting member and normally eccentrically and bearingly abutting an end face of an adjacent power input shaft forming part of said first power source when said input shaft is motionless, the flexibility of said finger being such that initial rotation of said input shaft sweeps said finger off said end face upon energization of said first power source.

4. A dual clutching mechanism comprising a double-ended clutch sleeve slidably mounted upon an output power shaft but secured thereto for driving rotation therewith, a clutch shifting member operatively engaging said clutch sleeve for sliding said clutch sleeve along said shaft to alternate positions of clutching engagement with first and second power input sources respectively, biasing means coupled to said shifting member and urging said shifting member and said clutch sleeve into clutching engagement of said clutch sleeve with said first power source, means sensitive to the energization of said first source and engaging said shifting member for retaining said shifting member and said clutch sleeve in clutching engagement with said second power source against the action of said biasing means until said first source is energized whereupon said sensitive means are deactivated and said biasing means effect clutching engagement with said first source, said sensitive means including a finger secured to said shifting member and normally extending into bearing engagement with an end portion of a power input shaft forming part of said first power source when said input shaft is motionless, and cooperating means on said finger and said input shaft end portion for disengaging said finger from said end portion upon rotation of said power input shaft; and manually operated reset means for moving said shifting member and said clutch sleeve into clutching engagement with said second power source and thereby for resetting said finger into bearing engagement with said input shaft end portion.

5. A dual clutching mechanism comprising a double-ended clutch sleeve slidably mounted upon an output power shaft but secured thereto for driving rotation therewith, a clutch shifting member operatively engaging said clutch sleeve for sliding said clutch sleeve along said shaft to alternate positions of clutching engagement with first and second power input sources respectively, biasing means coupled to said shifting member and urging said shifting member and said clutch sleeve into clutching engagement of said clutch sleeve with said first power source, resettable means sensitive to the energization of said first source and engaging said shifting member for retaining said shifting member and said clutch sleeve in clutching engagement with said second power source against the action of said biasing means until said first source is energized whereupon said sensitive means are deactivated and said biasing means effect clutching engagement with said first source; and cooperative resetting means formed on said shifting member and on input shaft means forming part of said second power source for resetting said sensitive means when said first power source is deenergized and upon energization of said second power source and rotation of said input shaft means.

6. A dual clutching mechanism comprising a double-ended clutch sleeve slidably mounted upon an output power shaft but secured thereto for driving rotation therewith, a clutch shifting member operatively engaging said clutch sleeve for sliding said clutch sleeve along said shaft to alternate positions of clutching engagement with first and second power input sources respectively, biasing means coupled to said shifting member and urging said shifting member and said clutch sleeve into clutching engagement of said clutch sleeve with said first power source, means sensitive to the energization of said first source and engaging said shifting members for retaining said shifting member and said clutch sleeve in clutching engagement with said second power source against the action of said biasing means until said first source is energized whereupon said sensitive means are deactivated and said biasing means effect clutching engagement with said first source, said sensitive means including a finger secured to said shifting member and normally extending into bearing engagement with an end portion of a power input shaft forming part of said first power source when said input shaft is motionless, and cooperating means on said finger and said input shaft end portion for disengaging said finger from said end portion upon rotation of said power input shaft, and cooperative resetting means formed on said shifting member and on input shaft means forming part of said second power source for resetting said sensitive means when said first power source is deenergized and upon energization of said second power source and rotation of said input shaft means, said resetting means including a cam member mounted eccentrically on the adjacent end of said second source input shaft means and a cooperative second finger secured to said shifting member, said second finger being disposed for engagement by said cam member upon rotation of said shaft means to move said shifting member and said clutch sleeve against the action of said biasing means to a position of clutching engagement thereof with said second power source and to reset said first-mentioned finger into bearing engagement thereof with said input shaft end portion of said first power source.

7. A dual clutch mechanism comprising an output shaft for said mechanism and having an elongated journal portion adjacent one end thereof, a double-ended clutch sleeve slideably mounted on said output shaft journal portion but keyed for driving rotation therewith, a pair of idler clutch members rotatably mounted on said shaft journal adjacent the ends respectively of said clutch member, cooperative clutching means formed on the ends of said clutch sleeve and on the adjacent surfaces of said idler members respectively, said idler members being spaced to afford limited longitudinal movement of said clutch sleeve between positions of alternate engagement with said idler members respectively, a pivotally mounted clutch shifting member operably engaging said clutch sleeve, a pair of power input shafts coupled respectively to said idler members for rotating the latter on said output shaft journal portion, biasing means coupled to said shifting member for moving said shifting member and said clutch sleeve into clutching engagement with one of said idler members, a flexible finger on said shifting member eccentrically abuttable with the adjacent end of the input shaft coupled to said one idler member when said input shaft is motionless, said shifting member and said finger when so engaged holding said shifting member and said clutch sleeve in clutching engagement thereof with the other of said idler members against the action of said biasing means, and means operable for resetting said flexible finger into abutment with said one idler member input shaft when rotation thereof ceases.

8. A dual clutch mechanism comprising an output shaft for said mechanism and having an elongated journal portion adjacent one end thereof, a double-ended clutch sleeve slideably mounted on said output shaft journal portion but keyed for driving rotation therewith, a pair of idler clutch members rotatably mounted on said shaft journal adjacent the ends respectively of said clutch member, cooperative clutching means formed on the ends of said clutch sleeve and on the adjacent surfaces of said idler members respectively, said idler members being spaced to afford limited longitudinal movement of said clutch sleeve between positions of alternate engagement with said idler members respectively, a pivotally mounted clutch shifting member operably engaging said clutch sleeve, a pair of power input shafts coupled respectively to said idler members for rotating the latter on said output shaft journal portion, biasing means coupled to said shifting member for urging said shifting member and said clutch sleeve into clutching engagement with one of said idler members, a flexible finger on said shifting member eccentrically abuttable with the adjacent end of the input shaft coupled to said one idler member when said input shaft is motionless, said shifting member and said finger when so engaged holding said shifting member and said clutch sleeve in clutching engagement thereof with the other of said idler members against the action of said biasing means, and means operable for resetting said flexible finger into abutment with said one idler member input shaft when rotation thereof ceases, said resetting means including a second flexible finger on said shifting member and positioned for engagement with a cam member eccentrically mounted on the adjacent end of the other of said input shafts, said cam member being disposed to engage said second finger upon rotation of the other of said input shafts to move said shifting member and said clutch sleeve into clutching engagement thereof with said other idler member whereat said first-mentioned flexible finger flexes into abutment with said one input shaft end.

9. A dual clutch mechanism comprising an output shaft having an elongated journal portion thereon, first and second idler gears spaceably mounted on said journal portion for rotation relative thereto, a double ended clutch sleeve slidably mounted on said journal portion for limited longitudinal movement between said idler gears, said clutch sleeve slidably engaging keying means secured to said journal portion for driving rotation of said clutch sleeve with said output shaft, cooperating clutch elements on each end of said clutch member and on the adjacent surfaces of said idler gears respectively, a pivotally mounted shifting member operably engaging said clutch sleeve for longitudinally moving said clutch sleeve between alternate clutching positions thereof with said idler gears respectively, a first power input shaft and pinion assembly engaging said first idler gear, said shaft having an end portion protruding outwardly of said pinion, a flexible finger on said shifting member eccentrically abutting said first shaft end portion to position said shifting member and said clutch sleeve in clutching position with said second idler gear when said first input shaft is motionless, biasing means coupled to said shifting member for urging said shifting member and said clutch sleeve into clutching engagement with said first idler gear, and a second flexible finger on said shifting member engageable with an eccentrically located cam surface formed on a second power input shaft and pinion engaged with said second idler gear, said second finger and said cam surface when engaged upon rotation of said second input shaft moving said shifting member and said clutch sleeve into clutching engagement with said second idler gear and resetting said first finger in abutment against said first input shaft.

10. A dual clutch mechanism comprising an output shaft having an elongated journal portion thereon, first and second idler gears spaceably mounted on said journal portion for rotation relative thereto, a double ended clutch sleeve slidably mounted on said journal portion for limited longitudinal movement between said idler gears, said clutch sleeve slidably engaging keying means secured to said journal portion for driving rotation of said clutch sleeve with said output shaft, cooperating clutch elements on each end of said clutch member and on the adjacent surfaces of said idler gears respectively, a pivotally mounted shifting member operably engaging said clutch sleeve for longitudinally moving said clutch sleeve between alternate clutching positions thereof with said idler gears respectively, a first power input shaft and pinion assembly engaging said first idler gear, said shaft having an end portion protruding outwardly of said pinion, a flexible finger on said shifting member eccentrically abutting said first input shaft end portion to position said shifting member and said clutch sleeve in clutching engagement with said second idler gear when said first input shaft is motionless, biasing means connected to said shifting member for urging said shifting member and said clutch sleeve into clutching engagement with said first idler gear, and a second flexible finger on said clutch shift engageable with an eccentrically located cam surface formed on a second power input shaft and pinion engaged with said second idler gear, said second finger and said cam surface when engaged upon rotation of said second power input shaft moving said shifting member and said clutch sleeve into clutching engagement with said second idler gear to reset said first-mentioned finger against said first input shaft, said cam surface having a relief surface portion thereon disposed to release said second flexible finger at a given angular position of said second shaft and pinion after said first flexible finger is reset against said first input shaft.

11. A dual clutch mechanism comprising an output shaft having an elongated journal portion thereon, first and second idler gears spaceably mounted on said journal portion for rotation relative thereto, a double ended clutch sleeve slidably mounted on said journal portion for limited longitudinal movement between said idler gears, said clutch sleeve slidably engaging keying means secured to said journal portion for driving rotation of said clutch sleeve with said output shaft, cooperating clutch elements on each end of said clutch sleeve and on the adjacent surfaces of said idler gears respectively, a pivotally mounted shifting member operably engaging said clutch sleeve for longitudinally moving said clutch sleeve between alternate clutching positions thereof with said idler gears respectively, a first power input shaft and pinion assembly engaging said first idler gear, said shaft having an end portion portruding outwardly of said pinion, a flexible finger on said shifting member eccentrically abutting said first input shaft end portion to position said shifting member and said clutch sleeve in clutching position with said second idler gear when said first input shaft is motionless, biasing means coupled to said shifting member for urging said shifting member and said clutch sleeve into clutching engagement with said first idler gear, and a second flexible finger on said shifting member disposed for engagement with an eccentrically located cam surface formed on a second power input shaft and pinion engaged with said second idler gear, said second finger and said cam surface when engaged moving said shifting member and said clutch sleeve into clutching engagement with said second idler gear to reset said first-mentioned finger against said first input shaft, said cam surface having a relief surface portion thereon disposed to release said second flexible finger at a given angular position of said second shaft and pinion after said first flexible finger is reset against said first input shaft, said first and said second flexible fingers being of such length that said first finger will protrude past said first power input shaft end and said second finger will flexibly engage said cam relief surface without being released therefrom when said second idler gear and said clutch sleeve elements do not mesh so that further rotation of said second input shaft will permit meshing of the latter clutch elements and release of said second finger.

References Cited
UNITED STATES PATENTS

| | | | |
|---|---|---|---|
| 2,745,294 | 5/1956 | Kron | 74—625 |
| 2,775,908 | 1/1957 | Elliott et al. | 74—625 |

FRED C. MATTERN, Jr., *Primary Examiner.*

W. S. RATLIFF, *Assistant Examiner.*